(No Model.)

F. BUSCHER.
HOSE.

No. 471,266. Patented Mar. 22, 1892.

Witnesses:
Emil Neuhart
Friedrich Gustav Wilhelm

F. Buscher Inventor.
By Wilhelm Bonnet
Attorneys.

UNITED STATES PATENT OFFICE.

FRANZ BUSCHER, OF DUNKIRK, NEW YORK.

HOSE.

SPECIFICATION forming part of Letters Patent No. 471,266, dated March 22, 1892.

Application filed September 28, 1891. Serial No. 406,978. (No model.)

*To all whom it may concern:*

Be it known that I, FRANZ BUSCHER, a citizen of the United States, residing at Dunkirk, in the county of Chautauqua and State of New York, have invented a new and useful Improvement in Hose, of which the following is a specification.

This invention relates to the hose or flexible pipes which are employed for connecting together the steam or heating pipes of railway-cars; and it has for its object to secure the screw nipples or couplings to the hose in a strong and reliable manner, so as to render the hose capable of withstanding a considerable tensile strain without withdrawing its screw-nipples.

Figure 1:
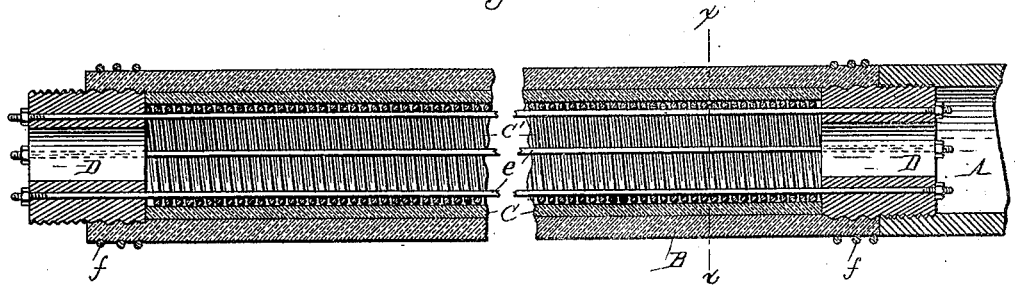
Figure 2:
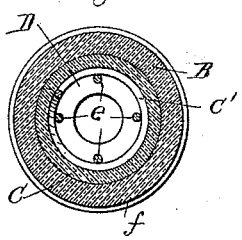

In the accompanying drawings, Figure 1 is a longitudinal section of a piece of my improved hose. Fig. 2 is a cross-section thereof in line *x x*, Fig. 1.

Like letters of reference refer to like parts in both figures.

A represents a portion of the steam-pipe of a railway-car, in connection with which my improved hose is shown.

B is the outer covering of the hose, which consists, preferably, of india-rubber, but it may be constructed of textile or other flexible material, if desired.

C is a tube of asbestus or other non-conducting material which lines the outer rubber tube B, so as to protect the same from contact with the steam or other heating medium and prevent deterioration thereof.

C' is a spiral spring arranged in the bore of the non-conducting tube C and bearing with its circumference against the surrounding inner surface of the asbestus. This spring forms an elastic core, which stiffens and strengthens the flexible hose and resists compression thereof, while at the same time permitting it to yield in all directions.

D D represents the screw nipples or stems secured to the ends of the flexible hose, whereby the hose is connected to the ends of the steam-pipes of adjoining railway-cars or other pipes. The screw-nipples consist of externally-screw-threaded collars fitted into the ends of the hose and projecting a short distance beyond the ends. These collars or nipples are united by tie-rods *e*, arranged lengthwise in the bore of the hose and passing through openings in the nipples, the rods being held in place by screw-nuts applied to the ends thereof and bearing against the outer ends of the nipples. The nipples are tightly drawn into the ends of the hose upon tightening the screw-nuts of the tie-rods. The latter are preferably arranged within the spiral spring, so as to aid in opposing the compression of the hose. The comparatively small diameter of the rods renders them sufficiently flexible to freely yield with the hose when the same is deflected.

The coils or convolutions of the spiral spring are arranged closely together, so as to obtain a high degree of flexible resistance, and in order to accomplish this the coils of the spring are first tightly compressed between the nipples by means or the nuts of the tie-rods, and the nuts are then loosened just enough to allow the spring to be deflected. The tie-rods *e* serve to prevent buckling of the spring when the hose is bent.

In order to form a more reliable joint, the covering of the hose is preferably drawn closely against the inner portions of the nipples by winding wire tightly around the ends of the hose, as shown at *f*.

The tie-rods enable the hose to withstand a considerable tensile strain without detracting from its pliability, and also retain the screw-nipples in place with great security.

While my improved hose is especially desirable as a connection for the steam-pipes of railway-cars, it may obviously be applied to other uses.

I claim as my invention—

1. A hose or flexible pipe provided at opposite ends with screw-stems or attaching-nipples and tie-rods connecting said nipples and extending from end to end of the hose, whereby the nipples mutually retain each other in the ends of the hose and the tie-rods resist tensile strains on the hose, substantially as set forth 2. A hose or flexible pipe provided at opposite ends with screw-stems or attaching-nipples and tie-rods extending through the hose from end to end thereof and connecting the nipples at opposite ends of the hose, substantially as set forth.

3. A hose or flexible pipe provided at opposite ends with attaching-nipples, internal tie-rods extending from end to end of the hose and connecting its end nipples, and a spiral spring arranged in the hose between the tie-rods and the inner surface of the hose, substantially as set forth.

4. A hose or flexible pipe provided with a non-conducting lining, screw-nipples arranged at opposite ends of the hose, tie-rods connecting said nipples and passing through the bore of the hose, and a spiral spring arranged in the hose between the tie-rods and the surrounding lining, substantially as set forth.

Witness my hand this 21st day of September, 1891.

FRANZ BUSCHER.

Witnesses:
CARL F. GEYER,
ALICE G. CONNELLY.